US009327733B2

(12) United States Patent  
Abington et al.

(10) Patent No.: US 9,327,733 B2  
(45) Date of Patent: May 3, 2016

(54) METHOD OF CONTROLLING A VEHICLE DURING A CLUTCH-TO-CLUTCH POWER UPSHIFT OF A TRANSMISSION

(71) Applicant: GM GLOBAL TECHNOLOGY OPERATIONS LLC, Detroit, MI (US)

(72) Inventors: James L. Abington, White Lake, MI (US); Matthew Kempeinen, Pinckney, MI (US); Paul R. Peterson, Orchard Lake, MI (US); Matthew D. Whitton, Howell, MI (US); Craig J. Hawkins, Howell, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 100 days.

(21) Appl. No.: 14/454,259

(22) Filed: Aug. 7, 2014

(65) Prior Publication Data

US 2016/0039422 A1 Feb. 11, 2016

(51) Int. Cl.
| | |
|---|---|
| *F16H 61/04* | (2006.01) |
| *B60W 30/19* | (2012.01) |
| *F02D 29/02* | (2006.01) |
| *B60W 10/06* | (2006.01) |
| *B60W 10/113* | (2012.01) |

(52) U.S. Cl.
CPC ............ *B60W 30/19* (2013.01); *B60W 10/06* (2013.01); *B60W 10/113* (2013.01); *F02D 29/02* (2013.01); *F16H 61/0437* (2013.01); *F16H 2061/0462* (2013.01); *F16H 2061/0492* (2013.01)

(58) Field of Classification Search
CPC ... B60W 30/19; B60W 10/06; B60W 10/113; F02D 29/02; F16H 61/0437
See application file for complete search history.

(56) References Cited

U.S. PATENT DOCUMENTS

| 8,050,830 | B2 * | 11/2011 | Komeda | B60K 6/387 701/51 |
|---|---|---|---|---|
| 8,579,751 | B2 * | 11/2013 | Phillips | B60K 6/445 475/221 |
| 8,682,545 | B2 * | 3/2014 | Jiang | F16H 61/688 192/103 C |
| 8,771,143 | B2 * | 7/2014 | Tanba | B60K 6/36 477/84 |
| 2002/0033059 | A1 * | 3/2002 | Pels | B60K 6/24 74/329 |
| 2005/0139035 | A1 * | 6/2005 | Lee | B60K 6/36 74/661 |
| 2008/0000312 | A1 * | 1/2008 | Lang | B60K 6/36 74/340 |
| 2010/0179024 | A1 * | 7/2010 | Holmes | B60K 6/36 477/5 |

* cited by examiner

*Primary Examiner* — Derek D Knight  
(74) *Attorney, Agent, or Firm* — Quinn Law Group, PLLC

(57) ABSTRACT

A method of controlling a clutch-to-clutch power-on upshift of a transmission includes defining a possible engine torque as a latched possible engine torque value. An on-coming clutch torque phase target value is defined as a latched on-coming clutch torque value, and held constant until a final ramp. A commanded engine torque is reduced and maintained to a maximum torque reduction value until a shift completion ratio is achieved. The commanded engine torque is increased until the commanded engine torque is equal to a restore ramp target value. Both the on-coming clutch torque and the commanded engine torque are simultaneously increased at a final ramp rate, such that the increase in the on-coming clutch torque parallels the increase in the commanded engine torque, until an actual engine torque is substantially equal to the possible engine torque, to complete the shift.

20 Claims, 4 Drawing Sheets

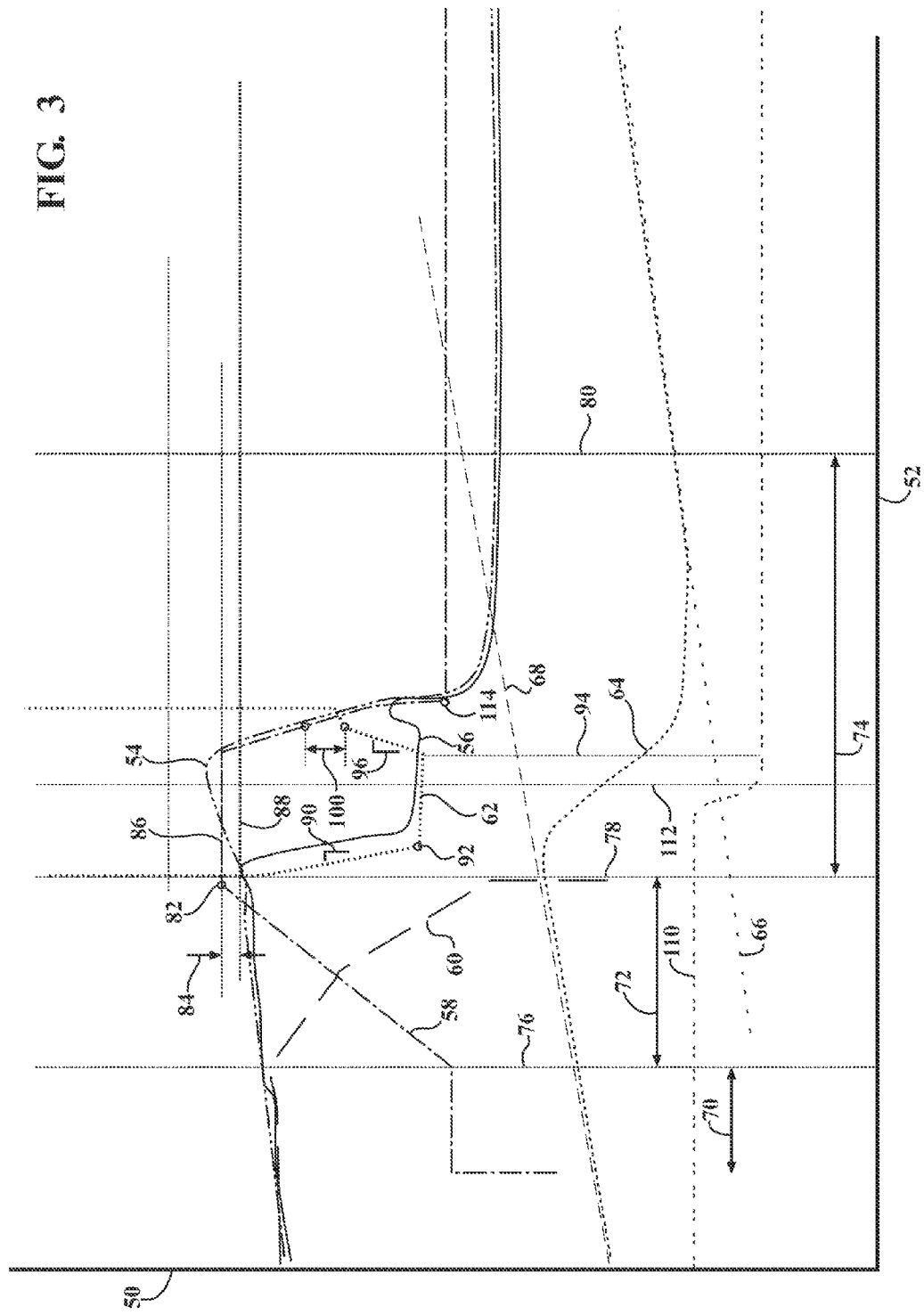

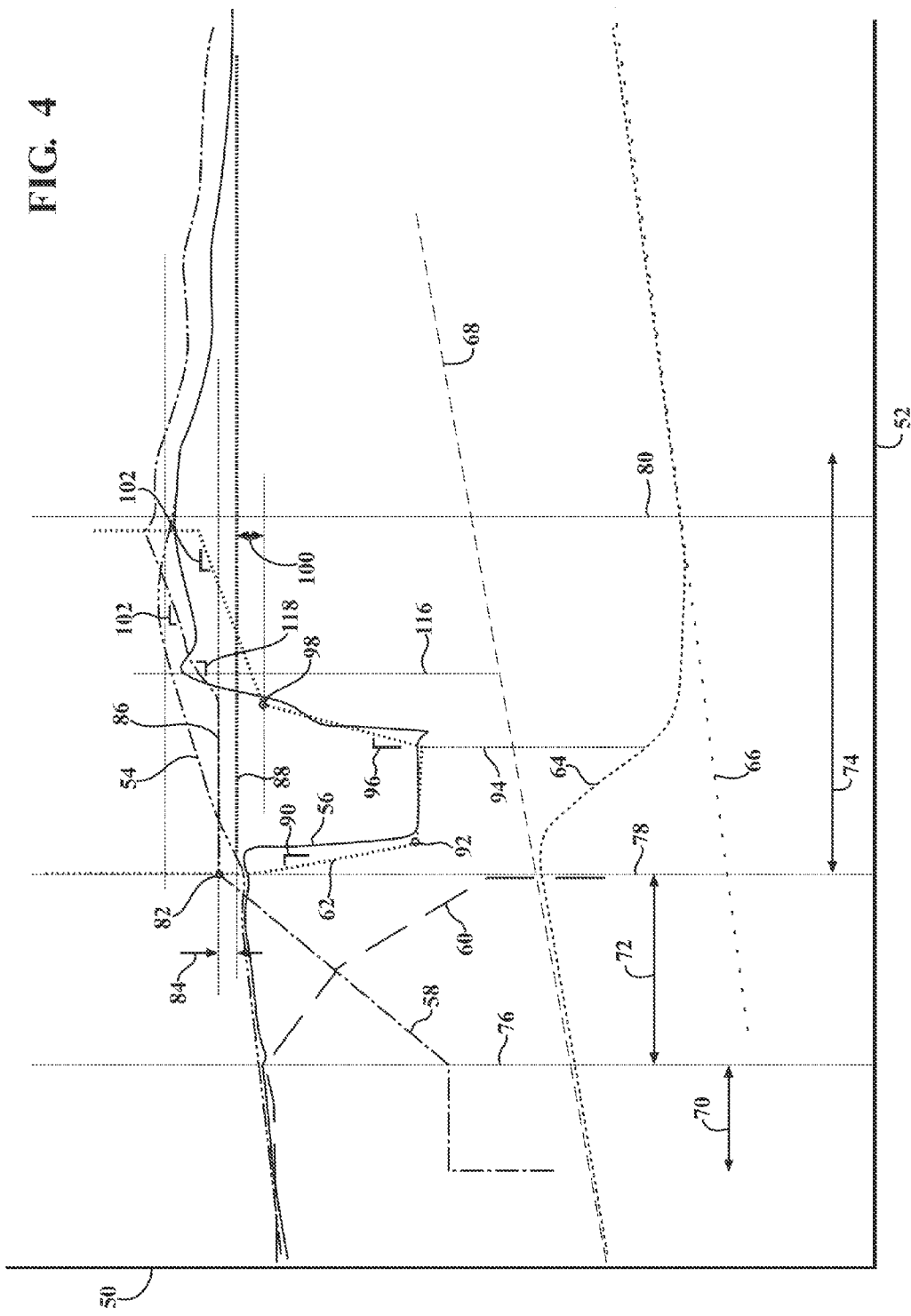

METHOD OF CONTROLLING A VEHICLE DURING A CLUTCH-TO-CLUTCH POWER UPSHIFT OF A TRANSMISSION

TECHNICAL FIELD

The disclosure generally relates to a method of controlling a vehicle, and more specifically to a method of controlling a clutch-to-clutch power-on upshift of a transmission of the vehicle.

BACKGROUND

Vehicular transmissions may include two or more different clutches that must be controlled during a shift. For example, a first clutch will engage, typically referred to as an on-coming clutch, while a second clutch will disengage, typically referred to as an off-going clutch. The on-coming clutch and the off-going clutch must be precisely controlled to provide a smooth shift. A shift may be defined as a power-on shift, in which the shift is performed while an engine is being commanded to provide a requested torque, such as when driving with an accelerator pedal depressed. Alternatively, a shift may be defined as a power-off shift, in which case the shift is performed when the engine is not being commanded to provide a requested torque, such as when the accelerator pedal is released. If the shift is transitioning from a lower gear ratio to a higher gear ratio, such as may occur when the vehicle is accelerating, then the shift may be defined as an upshift. If the shift is transitioning from a higher gear ratio to a lower gear ratio, such as may occur when the vehicle is decelerating, then the shift may be defined as a downshift. Accordingly, if the vehicle must perform a shift that requires a transition from a first clutch, i.e., an off-going clutch, to a second clutch, i.e., an on-coming clutch, while the vehicle is under power, in order to shift from a lower gear ratio to a higher gear ratio, the shift may be defined as a clutch-to-clutch power-on upshift.

SUMMARY

A method of controlling a vehicle during a clutch-to-clutch power-on upshift of a transmission of the vehicle is provided. The method includes increasing torque transfer through an on-coming clutch until an on-coming clutch torque is equal to an on-coming clutch torque phase target value, during a torque transition phase of the clutch-to-clutch power-on upshift. The on-coming clutch torque phase target value is different from a possible engine torque at the end of the torque transition phase by a pre-defined target offset value. Torque transfer through an off-going clutch is decreased during the torque transition phase. The possible engine torque at the end of the torque transition phase is defined as a latched possible engine torque value for an inertia phase of the clutch-to-clutch power-on upshift. The on-coming clutch torque phase target value is defined as a latched on-coming clutch torque value at the beginning of the inertia phase. Torque transfer is maintained through the on-coming clutch at the latched on-coming clutch torque value. A commanded engine torque is reduced at an initial reduction ramp rate, to a maximum torque reduction value, at the beginning of the inertia phase. The commanded engine torque is maintained at the maximum torque reduction value until a shift completion ratio is achieved. The commanded engine torque is increased at a restore ramp rate, until the commanded engine torque is equal to a restore ramp target value. The restore ramp target value is greater than the latched possible engine torque value by a pre-defined final ramp offset value, or is less than the latched possible engine torque value by the pre-defined final ramp offset value. Both the on-coming clutch torque and the commanded engine torque are simultaneously increased at a final ramp rate, such that the increase in the on-coming clutch torque parallels the increase in the commanded engine torque, until an actual engine torque is substantially equal to the possible engine torque.

Accordingly, by controlling the on-coming clutch torque to maintain the on-coming clutch torque phase target value through the inertia phase of the shift, and by paralleling the increase in the on-coming clutch torque with the final ramp rate of the commanded engine torque, the shift properties of the vehicle may be calibrated to a more consistent feel from vehicle to vehicle, without being affected by individual operating and performance characteristics of each specific vehicle.

The above features and advantages and other features and advantages of the present teachings are readily apparent from the following detailed description of the best modes for carrying out the teachings when taken in connection with the accompanying drawings.

BRIEF DESCRIPTION OF THE DRAWINGS

FIG. 3 is a graph representing the clutch-to-clutch power-on upshift with a throttle lift out situation occurring midway through the shift, showing a change in magnitude of the different control values over time.

FIG. 4 is a graph representing the clutch-to-clutch power-on upshift with a quick engine torque restoration situation occurring midway through the shift, showing a change in magnitude of the different control values over time.

DETAILED DESCRIPTION

Those having ordinary skill in the art will recognize that terms such as "above," "below," "upward," "downward," "top," "bottom," etc., are used descriptively for the figures, and do not represent limitations on the scope of the disclosure, as defined by the appended claims. Furthermore, the teachings may be described herein in terms of functional and/or logical block components and/or various processing steps. It should be realized that such block components may be comprised of any number of hardware, software, and/or firmware components configured to perform the specified functions.

Figure 1:
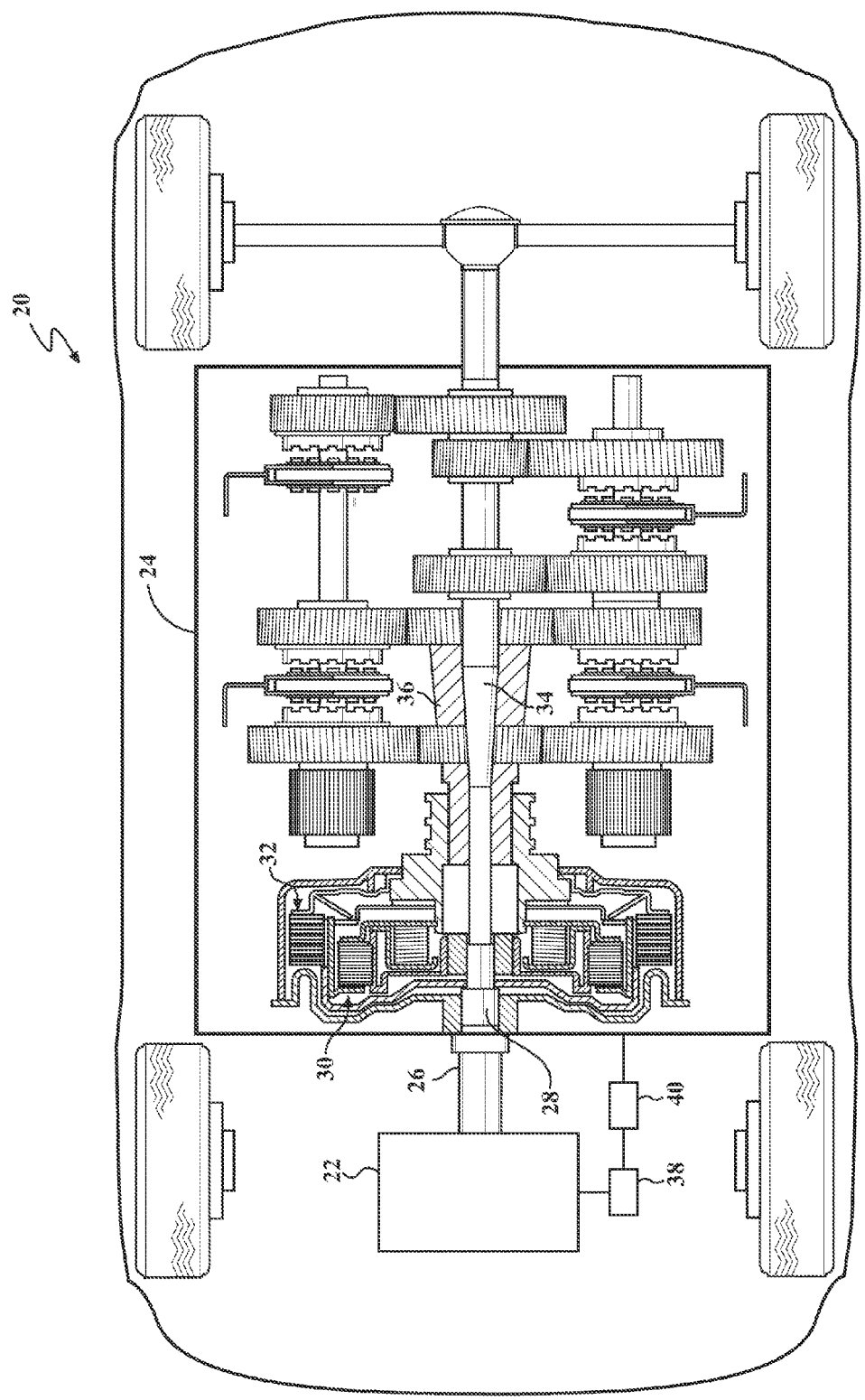
FIG. 1 is a schematic plan view of a vehicle.

Referring to the Figures, wherein like numerals indicate like parts throughout the several views, a vehicle is generally shown at 20 in FIG. 1. The vehicle 20 includes an engine 22 and a transmission 24. The exemplary embodiment of the transmission 24 is shown in FIG. 1 as a dual clutch transmission 24. While the invention is described relative to the exemplary dual clutch transmission 24 shown in FIG. 1, it should be appreciated that the invention may be utilized with other styles of transmission 24, not shown or described herein.

The engine 22 may include any style and/or configuration suitable for use in a vehicle 20, such as but not limited to a gasoline or diesel engine 22. The engine 22 produces an actual engine torque 56, which is output from the engine 22 through a crankshaft 26. The crankshaft 26 is coupled to an input shaft 28 of the transmission 24, and receives the actual engine torque 56 from the crankshaft 26.

The dual clutch transmission 24 includes a first clutch 30 and a second clutch 32. The first clutch 30 is coupled to a first transmission shaft 34, and selectively connects the first transmission shaft 34 to the crankshaft 26. The second clutch 32 is coupled to a second transmission shaft 36, and selectively connects the second transmission shaft 36 to the crankshaft 26. The first clutch 30 and the second clutch 32 may include, for example, but are not limited to, a wet clutch or a dry clutch. When engaged, the first clutch 30 interconnects the first transmission shaft 34 with the crankshaft 26 to continuously transmit torque therebetween. When disengaged, the first clutch 30 disconnects the first transmission shaft 34 from the crankshaft 26 to disallow torque transmission therebetween. Similarly, when the second clutch 32 is engaged, the second clutch 32 interconnects the second transmission shaft 36 with the crankshaft 26 to continuously transmit torque therebetween. When disengaged, the second clutch 32 disconnects the second transmission shaft 36 from the crankshaft 26 to disallow torque transmission therebetween. As described in greater detail below, either the first clutch 30 or the second clutch 32 may be defined as an on-coming clutch, and the other of the first clutch 30 or the second clutch 32 may be defined as an off-going clutch. Furthermore, it should be appreciated that the on-coming clutch and the off-going clutch may include any two clutches of the transmission, and should not be limited to the first clutch and the second clutch of the exemplary embodiment described above.

The first transmission shaft 34 may include either an inner transmission shaft or an outer transmission shaft, and the second transmission shaft 36 includes the other of the inner transmission shaft and the outer transmission shaft. The outer transmission shaft defines a hollow core, with the inner transmission shaft disposed therein and concentric with the outer transmission shaft as is known with dual clutch transmissions 24. FIG. 1 shows the first transmission shaft 34 as the inner transmission shaft, and the second transmission shaft 36 as the outer transmission shaft. However, it should be appreciated that the first transmission shaft 34 may alternatively be defined as the outer transmission shaft and the second transmission shaft 36 may be defined as the inner transmission shaft. Furthermore, as described in greater detail below, either the first transmission shaft 34 or the second transmission shaft 36 may be defined as an on-coming shaft, with the other of the first transmission shaft 34 or the second transmission shaft 36 being defined as an off-going shaft. Furthermore, it should be appreciated that the on-coming shaft and the off-going shaft may include any two shafts of the transmission, and should not be limited to the first transmission shaft and the second transmission shaft of the exemplary embodiment described above.

The vehicle 20 further includes at least on controller for controlling the operation of the vehicle 20, and specifically the operation of the engine 22 and the transmission 24. For example, the vehicle 20 may include an engine control unit 38 that is operable to control the engine 22, and a transmission control unit 40 that is operable to control the transmission 24. The engine control unit 38 and the transmission control unit 40 may be connected to share information and coordinate the control of the engine 22 and the transmission 24. Alternatively, the engine control unit 38 and the transmission control unit 40 may be combined as a single vehicle controller that is operable to control both the engine 22 and the transmission 24, as well as other vehicle 20 systems. As used herein, the term vehicle controller, or just controller, is used broadly to refer to either a single device for controlling both the engine 22 and the transmission 24, or may alternatively refer to a combination of devices, such as but not limited to the combination of the engine control unit 38 and the transmission control unit 40, to control both the engine 22 and the transmission 24.

The vehicle controller may include a computer and/or processor, and include all software, hardware, memory, algorithms, connections, sensors, etc., necessary to manage and control the operation of the vehicle 20, including the engine 22 and the transmission 24. As such, a method, described in greater detail below, may be embodied as a program operable on the vehicle controller. It should be appreciated that the vehicle controller may include any device capable of analyzing data from various sensors, comparing data, making the necessary decisions required to control the operation of the vehicle 20, including the engine 22 and the transmission 24, and executing the required tasks necessary to control the operation of the vehicle 20, including the engine 22 and the transmission 24.

During operation of the exemplary dual clutch transmission 24, the first clutch 30 may connect the first transmission shaft 34 with the input shaft 28 of the transmission 24, while the second clutch 32 disconnects the second transmission shaft 36 from the input shaft 28 of the transmission 24. Alternatively, the first clutch 30 may disconnect the first transmission shaft 34 from the input shaft 28, while the second clutch 32 connects the second transmission shaft 36 from the input shaft 28. The engagement and disengagement of the first clutch 30 and the second clutch 32 must be precisely controlled to properly and smoothly execute these shifting operations. Accordingly, a method of controlling the vehicle 20 during a clutch-to-clutch power-on upshift is described below. As noted above, the clutch-to-clutch power-on upshift is a shift operation to shift from an off-going clutch to an on-coming clutch, while the vehicle 20 is under power, in order to shift from a lower gear ratio to a higher gear ratio.

Figure 2:
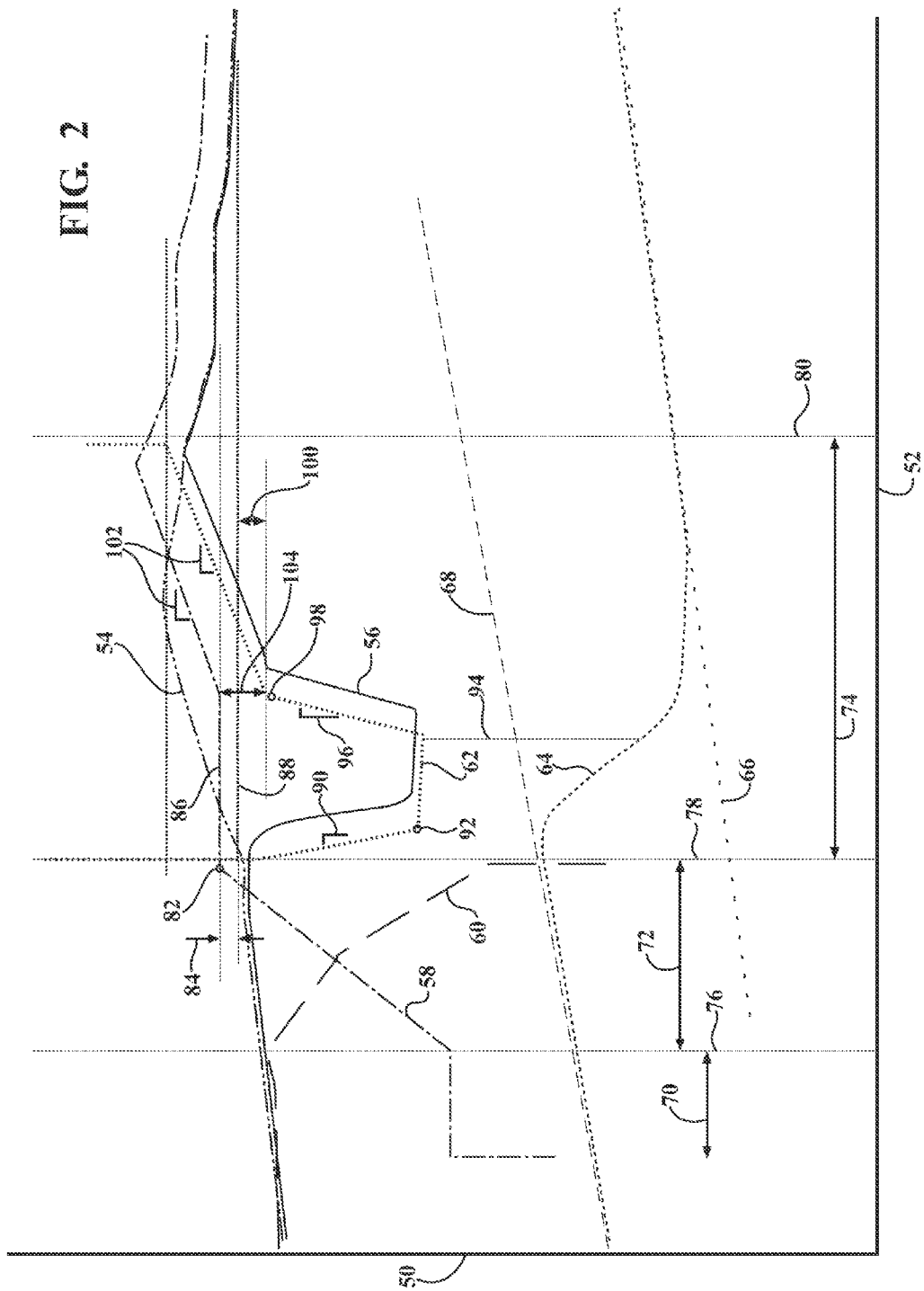
FIG. 2 is a graph representing a clutch-to-clutch power-on upshift of a transmission of a vehicle, showing a change in magnitude of a plurality of different control values over time, during a typical execution of the shift.

Referring to FIGS. 2 through 4, various different control values are shown over time. A change in magnitude of the different control values is generally indicated by a change along a y-axis 50, and a change in time is generally indicated by a change along an x-axis 52. The different control values shown in the Figures includes a possible engine torque 54, an actual engine torque 56, an on-coming clutch torque 58, and off-going clutch torque 60, a commanded engine torque 62, an engine speed 64, an on-coming shaft speed 66, and an off-going shaft speed 68.

The possible engine torque 54 is defined herein as the maximum amount of torque that the engine 22 could produce, with no torque control protocols enacted, at the current rotational speed of the engine 22 and the current ambient conditions. The torque control protocols are controls that may be enacted to reduce actual engine torque 56 and speed without driver input. Torque control protocols may include, but are not limited to, adjustments to a fueling rate, an intake air rate, and a spark cut rate. The possible engine torque 54 is estimated by the vehicle controller from a model, and is based on the current operating conditions of the vehicle 20. The commanded engine torque 62 is the amount of torque that the vehicle controller commands the engine 22 to produce. The actual engine torque 56 is the actual amount of torque that the engine 22 is currently producing with the torque control protocols enacted, in response to the commanded engine torque 62. The actual engine torque 56 is controlled by the vehicle controller, which is operable to adjust at least one of the torque control protocols, i.e., the fueling rate, the intake air rate, and/or the spark cut rate, in response to the commanded engine torque 62.

The off-going clutch is the clutch that is being disengaged during the shift. The off-going clutch torque 60 is the amount of torque that the off-going clutch may transfer at a specific point in time. The off-going shaft speed 68 is the rotational speed of the gear shaft that is being disengaged during the shift, i.e., shifting out of. The on-coming clutch is the clutch that is being engaged during the shift. The on-coming clutch torque 58 is the amount of torque that the on-coming clutch may transfer at a specific point in time. The on-coming shaft speed 66 is the rotational speed of the gear shaft that is being engaged during the shift, i.e., shifting into. The engine speed 64 is the rotational speed of the engine 22, i.e., the rotational speed of the crankshaft 26.

FIGS. 2 through 4 are generally sectioned to indicate different phases of the clutch-to-clutch power-on upshift. The different phases include a preparatory phase 70, a torque transition phase 72, and an inertia phase 74. The change between different phases is delineated by vertical reference lines. Specifically, a first reference line 76 indicates the transition between the preparatory phase 70 and the torque transition phase 72, a second reference line 78 indicates the transition between the torque transition phase 72 and the inertia phase 74, and a third reference line 80 indicates the transition from the inertia phase 74 to completion of the clutch-to-clutch power-on upshift.

Referring to FIG. 2, a typical execution of the clutch-to-clutch power-on upshift of the transmission 24 is generally shown. During the preparatory phase 70, after the vehicle controller has commanded the clutch-to-clutch power-on upshift be executed, the on-coming clutch is prepared for engagement. The on-coming clutch is prepared by increasing fluid pressure to the on-coming clutch until the on-coming clutch is ready to begin torque transfer. Once the vehicle controller has commanded the clutch-to-clutch power-on upshift be executed, a torque command for the torque transition phase is defined to allow the oncoming shaft to get up to speed and ensure that the position control is moving to eliminate latency. Once the actual position of the on-coming clutch achieves the commanded position, (which may be looked up on a table relating torque to clutch positions), the preparatory phase 70 is complete and the torque transition phase 72 begins.

Once the on-coming clutch is prepared to begin torque transfer, the clutch-to-clutch power-on upshift exits the preparatory phase 70 and begins the torque transition phase 72. During the torque transition phase 72, torque transfer through the on-coming clutch is increased until the on-coming clutch torque 58 is equal to an on-coming clutch torque phase target value 82. The on-coming clutch torque phase target value 82 is equal to engine torque 54 near the end of the torque transition phase 72, plus a pre-defined target offset value 84. The pre-defined target offset value 84 may be positive or negative. Furthermore, the pre-defined target offset value 84 may include a value of zero. Preferably, the pre-defined target offset value 84 is within a range of −5% and 5% of the possible engine torque 54. The pre-defined target offset value 84 may vary depending upon the engine speed and the torque at the time of the upshift, and may be looked up from a calibratable x/y/z table.

Once the on-coming clutch torque 58 is increased to the on-coming clutch torque phase target value 82, and at the start of the inertial phase 74, the on-coming clutch torque 58 is latched at the on-coming clutch torque phase target value 82 to define a latched on-coming clutch torque value 86. As used herein, the term "latched" is defined as being held at a constant value over time. Accordingly, at the end of the torque transition phase 72, the torque capacity of the on-coming clutch is held constant at the on-coming clutch torque phase target value 82. This value, i.e., the on-coming clutch torque phase target value 82, is defined as the latched on-coming clutch torque value 86.

Simultaneously with the increase in torque transfer of the on-coming clutch, during the torque transition phase 72, torque transfer through the off-going clutch is decreased. The torque capacity of the off-going clutch is decreased until no torque is transferred through the off-going clutch, thereby disconnecting the off-going shaft from the crankshaft 26 of the engine 22.

At the beginning of the inertia phase 74, the value of the possible engine torque 54 at the end of the torque transition phase 72 is latched to define a latched possible engine torque value 88. The latched possible engine torque value 88 remains constant throughout the inertia phase 74 of the clutch-to-clutch power-on upshift. It should be appreciated that the difference between the latched on-coming clutch torque value 86 and the latched possible engine torque value 88 is equal to the pre-defined target offset value 84 described above.

Torque transfer through the on-coming clutch is maintained through the beginning portion of the inertia phase 74, at the latched on-coming clutch torque value 86. While torque transfer of the on-coming clutch is being maintained at the latched on-coming clutch torque value 86, the vehicle controller reduces the commanded engine torque 62. The commanded engine torque 62 is reduced at an initial reduction ramp rate 90, until the commanded torque is equal to a maximum torque reduction value 92. The initial reduction ramp rate 90 and the maximum torque reduction value 92 are determined by calibration tables that reference engine torque and speed, as well as desired shift time. Smaller shift times and higher engine speeds require greater torque reductions to drop the engine speed faster.

The commanded engine torque 62 is maintained at the maximum torque reduction value 92 until a shift completion ratio 94 is achieved. The shift completion ratio 94 is defined herein as the minimum allowable value of the ratio between a rotational speed of an engine 22 and a rotational speed of the on-coming shaft, which must be achieved, prior to increasing the commanded engine torque 62.

Once the shift completion ratio 94 has been achieved, then the vehicle controller increases the commanded engine torque 62. The commanded engine torque 62 is increased at a restore ramp rate 96, until the commanded engine torque 62 is equal to a restore ramp target value 98. The increase in the commanded engine torque 62 causes an increase in the actual engine torque 56. As can be seen in FIG. 2, the engine speed 64 decreases while the commanded engine torque 62 is maintained at the maximum torque reduction value 92. Once the commanded engine torque 62 is increased, the engine speed 64 begins to accelerate to align with the on-coming shaft speed 66.

The restore ramp target value 98 may be either greater than the latched possible engine torque value 88 by a pre-defined final ramp offset value 100, or less than the latched possible engine torque value 88 by the pre-defined final ramp offset value 100. As shown in the exemplary embodiment of FIG. 2, the restore ramp target value 98 is less than the latched possible engine torque value 88 by the pre-defined final ramp offset value 100. Preferably, the pre-defined final ramp offset value 100 is within a range of −1% to −5% of the latched possible engine torque 54. The pre-defined final ramp offset value 100 is what determines the slope of the final ramp rate 102. The delta or difference in torque results in rotational acceleration of the engine ($\Delta M = I\alpha$).

Once the commanded engine torque 62 is increased to the restore ramp target value 98, then both the on-coming clutch torque 58 and the commanded engine torque 62 are simultaneously increased at a final ramp rate 102. Accordingly, the increase in the on-coming clutch torque 58 parallels or is equal to the increase in the commanded engine torque 62. It should be appreciated that the on-coming clutch torque 58 is increased from the latched on-coming clutch torque value 86. As such, it should be appreciated that the on-coming clutch torque 58 is de-latched once the commanded engine torque 62 is increased to the restore ramp target value 98. Both the on-coming clutch torque 58 and the commanded engine torque 62 are increased until the actual engine torque 56 is substantially equal to the possible engine torque 54. The actual engine torque 56 may be defined as being substantially equal to the possible engine torque 54 when the actual engine torque 56 is within the range of 1% to 2% of the possible engine torque 54. However, it should be appreciated that the actual engine torque 56 may be defined as being substantially equal to the possible engine torque 54 in some other way.

Once the commanded engine torque 62 is increased to the restore ramp target value 98, then the commanded engine torque 62 and the on-coming clutch torque 58 are separated by a delta torque 104. As shown in FIG. 2, the delta torque 104 is equal to the sum of the pre-defined target offset value 84 and the pre-defined final ramp offset value 100. However, it should be appreciated that this may not always be the case. For example, if the restore ramp target value 98 is defined to equal a value that is greater than the latched possible engine torque value 88, then the delta torque 104 would equal the difference between the pre-defined target offset value 84 and the pre-defined final ramp offset value 100. During the typical execution of the clutch-to-clutch power-on upshift of the transmission 24, such as shown in FIG. 2, the delta torque 104 between the on-coming clutch torque 58 and the commanded engine torque 62 is maintained until the actual engine torque 56 is substantially equal to the possible engine torque 54, and the shift is complete.

If the actual engine torque 56 fails to substantially equal the possible engine torque 54 within a pre-defined time period, then the vehicle controller will increase the engine commanded torque 62 to meet the possible engine torque 54 at a rate that is determined by a remaining shift time and the remaining delta or difference between the engine commanded torque 62 and the possible engine torque 54 at the termination of the pre-defined time period.

FIG. 3 shows a situation in which a throttle is released midway through the clutch-to-clutch power-on upshift. A throttle position is generally shown by line 110. As shown in FIG. 3, the release of the throttle 110 is generally indicated by a fourth reference line 112. After the release of the throttle 110, the possible engine torque 54 decreases rapidly. In order to identify such a situation, the vehicle controller continuously monitors the possible engine torque 54 to identify a decrease in the possible engine torque 54 to a value below the latched possible engine torque value 88, or below the latched on-coming clutch torque value 86.

If the vehicle controller identifies a decrease in the possible engine torque 54 to levels below the latched possible engine torque value 88 or the latched on-coming clutch torque value 86, then the vehicle controller may adjust the on-coming clutch torque 58, from the latched on-coming clutch torque value 86, to continuously parallel the possible engine torque 54. Accordingly, the vehicle controller overrides the on-coming clutch torque 58 once the possible engine torque 54 falls below the latched possible engine torque value 88 or the latched on-coming clutch torque value 86.

If the controller has overridden the on-coming clutch torque 58, then the controller adjusts the on-coming clutch torque 58 to mimic the fall of the possible engine torque 54. If the possible engine torque 54 rises to a value greater than the latched on-coming clutch torque value 86, then the controller will release the override of the the on-coming clutch torque 58 at the latched on-coming clutch torque value 86, and resume the procedure as described above. If however, as shown in FIG. 3, the possible engine torque 54 continues to decrease, then the vehicle controller may stop the increase of the commanded engine torque 62, prior to completion of the shift. Accordingly, when the possible engine torque 54 is less than the latched possible engine torque value 88, and the difference between the commanded engine torque 62 and the possible engine torque 54 is equal to or less than the pre-defined final ramp offset value 100, then the vehicle controller stops the increase in the commanded engine torque 62, and allows the actual engine torque 56 to fall or decrease along with the possible engine torque 54. The vehicle controller may maintain at least a minimum on-coming clutch torque value 114 to prevent negative clutch torque.

FIG. 4 shows a situation in which the actual engine torque 56 restores more quickly than anticipated, in response to the commanded engine torque 62. As shown in FIG. 4, a fifth reference line 116 indicates a point in time at which the actual engine torque 56 has risen above the on-coming clutch torque 58. In order to identify this situation, the vehicle controller continuously monitors the actual engine torque 56 to identify an increase in the actual engine torque 56 to a value greater than the on-coming clutch torque 58.

If the vehicle controller identifies a situation in which the actual engine torque 56 increases to levels greater than the on-coming clutch torque 58, then the vehicle controller may increase the on-coming clutch torque 58 at a rate 118 that is faster than the final ramp rate 102, until the on-coming clutch torque 58 is equal to or greater than the actual engine torque 56. Once the on-coming clutch torque 58 is equal to or greater than the actual engine torque 56, then the on-coming clutch torque 58 may be increased at the same final ramp rate 102 as the commanded engine torque 62, as described above, until the shift is complete.

The detailed description and the drawings or figures are supportive and descriptive of the disclosure, but the scope of the disclosure is defined solely by the claims. While some of the best modes and other embodiments for carrying out the claimed teachings have been described in detail, various alternative designs and embodiments exist for practicing the disclosure defined in the appended claims.

The invention claimed is:

1. A method of controlling a vehicle during a clutch-to-clutch power-on upshift of a transmission of the vehicle, the method comprising:

increasing torque transfer through an on-coming clutch until an on-coming clutch torque is equal to an on-coming clutch torque phase target value, during a torque transition phase of the clutch-to-clutch power-on upshift, wherein the on-coming clutch torque phase target value is different from a possible engine torque at the end of the torque transition phase by a pre-defined target offset value;

decreasing torque transfer through an off-going clutch during the torque transition phase;

defining the possible engine torque at the end of the torque transition phase as a latched possible engine torque value for an inertia phase of the clutch-to-clutch power-on upshift;

defining the on-coming clutch torque phase target value as a latched on-coming clutch torque value at the beginning of the inertia phase;
maintaining torque transfer through the on-coming clutch at the latched on-coming clutch torque value;
reducing a commanded engine torque, at an initial reduction ramp rate, to a maximum torque reduction value, at the beginning of the inertia phase;
maintaining the commanded engine torque at the maximum torque reduction value until a shift completion ratio is achieved;
increasing the commanded engine torque, at a restore ramp rate, until the commanded engine torque is equal to a restore ramp target value, wherein the restore ramp target value is greater than the latched possible engine torque value by a pre-defined final ramp offset value, or is less than the latched possible engine torque value by the pre-defined final ramp offset value; and
simultaneously increasing both the on-coming clutch torque and the commanded engine torque, at a final ramp rate, such that the increase in the on-coming clutch torque parallels the increase in the commanded engine torque, until an actual engine torque is substantially equal to the possible engine torque, to complete the shift.

2. The method set forth in claim 1 wherein the actual engine torque is controlled by an engine control module operable to adjust at least one of a fueling rate, an intake air rate, a spark cut rate, in response to the commanded engine torque.

3. The method set forth in claim 1 further comprising monitoring the possible engine torque to identify a decrease in the possible engine torque to a value below the latched possible engine torque value, prior to completing the shift.

4. The method set forth in claim 3 further comprising adjusting the on-coming clutch torque, from the latched on-coming clutch torque value, to continuously parallel the possible engine torque, when the possible engine torque is less than the latched on-coming clutch torque value.

5. The method set forth in claim 4 further comprising stopping the increase of the commanded engine torque, prior to completion of the shift, when the possible engine torque is less than the latched possible engine torque value, and the difference between the commanded engine torque and the possible engine torque is equal to or less than the pre-defined final ramp offset value.

6. The method set forth in claim 5 further comprising maintaining at least a minimum on-coming clutch torque value to prevent negative clutch torque command.

7. The method set forth in claim 1 further comprising monitoring the actual engine torque to identify an increase in the actual engine torque to a value greater than a current commanded on-coming clutch torque value, prior to completing the shift.

8. The method set forth in claim 7 further comprising increasing the on-coming clutch torque, at a pre-defined rate that is greater than the final ramp rate, when the actual engine torque is greater than the latched on-coming clutch torque value, until the on-coming clutch torque is equal to or greater than the actual engine torque.

9. The method set forth in claim 1 further comprising preparing the on-coming clutch, during a preparatory phase of the clutch-to-clutch power-on upshift, prior to increasing torque transfer through the on-coming clutch to the on-coming clutch torque phase target value during the torque transition phase.

10. The method set forth in claim 1 wherein the pre-defined target offset value is within a range of −5% and 5% of the possible engine torque.

11. The method set forth in claim 1 wherein the pre-defined final ramp offset value is within a range of −1% and −5% of the latched possible engine torque.

12. The method set forth in claim 1 wherein the actual engine torque is substantially equal to the possible engine torque when the actual engine torque is within a range of 1% and 2% of the possible engine torque.

13. The method set forth in claim 1 wherein the shift completion ratio is the minimum allowable value of the ratio between a rotational speed of an engine and a rotational speed of an on-coming shaft, which must be achieved prior to increasing the commanded engine torque at the restore ramp rate.

14. The method set forth in claim 1 further comprising providing at least one controller operable to control an engine and the transmission of the vehicle to complete the clutch-to-clutch power-on upshift.

15. A method of controlling a vehicle during a clutch-to-clutch power-on upshift of a transmission of the vehicle, the method comprising:
defining a possible engine torque as a latched possible engine torque value;
defining an on-coming clutch torque phase target value as a latched on-coming clutch torque value;
maintaining torque transfer through the on-coming clutch at the latched on-coming clutch torque value;
reducing a commanded engine torque to a maximum torque reduction value;
maintaining the commanded engine torque at the maximum torque reduction value until a shift completion ratio is achieved;
increasing the commanded engine torque until the commanded engine torque is equal to a restore ramp target value, wherein the restore ramp target value is greater than the latched possible engine torque value by a pre-defined final ramp offset value, or is less than the latched possible engine torque value by the pre-defined final ramp offset value; and
simultaneously increasing both the on-coming clutch torque and the commanded engine torque such that the increase in the on-coming clutch torque parallels the increase in the commanded engine torque, until an actual engine torque is substantially equal to the possible engine torque, to complete the shift.

16. The method set forth in claim 15 further comprising monitoring the possible engine torque to identify a decrease in the possible engine torque to a value below the latched possible engine torque value or the latched on-coming torque value, prior to completing the shift.

17. The method set forth in claim 16 further comprising adjusting the on-coming clutch torque, from the latched on-coming clutch torque value, to continuously parallel the possible engine torque, when the possible engine torque is less than the latched possible engine torque value.

18. The method set forth in claim 17 further comprising stopping the increase of the commanded engine torque, prior to completion of the shift, when the possible engine torque is less than the latched possible engine torque value, and the difference between the commanded engine torque and the possible engine torque is equal to or less than the pre-defined final ramp offset value.

19. The method set forth in claim 15 further comprising monitoring the actual engine torque to identify an increase in the actual engine torque to a value greater than the on-coming clutch torque value, prior to completing the shift.

20. The method set forth in claim 19 further comprising increasing the on-coming clutch torque, at a pre-defined rate that is greater than the final ramp rate, when the actual engine torque is greater than the latched on-coming clutch torque value, until the on-coming clutch torque is equal to or greater than the actual engine torque.

* * * * *